(12) United States Patent
Kohyama et al.

(10) Patent No.: US 7,299,421 B2
(45) Date of Patent: Nov. 20, 2007

(54) SCREEN CHANGE CONTROL APPARATUS AND METHOD USING TABS

(75) Inventors: Naohide Kohyama, Hamamatsu (JP); Hiroshi Hamamatsu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 399 days.

(21) Appl. No.: 10/138,384

(22) Filed: May 3, 2002

(65) Prior Publication Data
US 2002/0174202 A1 Nov. 21, 2002

(30) Foreign Application Priority Data
May 7, 2001 (JP) .............................. 2001-136429

(51) Int. Cl.
*G06F 3/048* (2006.01)
*G06F 3/00* (2006.01)
(52) U.S. Cl. ...................................... 715/777; 715/775
(58) Field of Classification Search ................ 715/777, 715/775, 804, 853
See application file for complete search history.

(56) References Cited

U.S. PATENT DOCUMENTS

| | | | | |
|---|---|---|---|---|
| 5,623,591 A * | 4/1997 | Cseri | ............................ | 715/762 |
| 5,745,716 A * | 4/1998 | Tchao et al. | .................. | 715/777 |
| 5,870,091 A | 2/1999 | Lazarony, Jr. et al. | | |
| 6,323,883 B1 * | 11/2001 | Minoura et al. | ............. | 715/784 |
| 6,520,410 B2 * | 2/2003 | Putman et al. | .............. | 235/380 |
| 6,538,998 B1 * | 3/2003 | Garimella | .................... | 370/241 |
| 6,654,950 B1 * | 11/2003 | Barnishan | .................... | 717/136 |
| 6,691,138 B1 * | 2/2004 | Kirkpatrick et al. | ........ | 707/204 |
| 6,741,268 B1 * | 5/2004 | Hayakawa | .................. | 715/777 |
| 6,842,877 B2 * | 1/2005 | Robarts et al. | ............. | 715/708 |
| 7,106,298 B1 * | 9/2006 | Turner et al. | ................ | 345/156 |

FOREIGN PATENT DOCUMENTS

| | | |
|---|---|---|
| JP | 63-228314 | 9/1988 |
| JP | 09-167049 | 6/1997 |
| JP | 09-297738 | 11/1997 |

OTHER PUBLICATIONS

Microsoft Corporation, Microsoft Excel 2000, 1985-1999 Microsoft Corporation, attached screen shots MSExcell fig 1-5.*

* cited by examiner

*Primary Examiner*—John Cabeca
*Assistant Examiner*—Dennis G. Bonshock
(74) *Attorney, Agent, or Firm*—Morrison & Foerster LLP

(57) ABSTRACT

A plurality of displayable screens are classified into a plurality of screen groups in such a manner that two or more of the screens belong to each individual screen group. Once a desired one of the screen groups is designated by activation of a shift switch, respective tabs of the two or more screens belonging to the designated screen group are visually displayed on a display device. Then, once a desired one of the thus-displayed tabs is designated by activation of a tab switch, the screen corresponding to the thus-designated tab is displayed on the display device. Even when the tab display has been switched by designating another screen group, the screen corresponding to the last designated tab (i.e., main screen), is prevented from being changed unless another tab is designated.

9 Claims, 9 Drawing Sheets

| SCREEN IDENTIFICATION SIGN | TAB NO. (SCREEN NO.) y | TOTAL NUMBER OF TABS PER SCREEN GROUP T | TAB SET NO. s | TAB SWITCH NO. t |
|---|---|---|---|---|
| A | 1 | 4 | 1 | 1 |
| B | 2 | 4 | 1 | 2 |
| C | 3 | 4 | 1 | 3 |
| D | 4 | 4 | 1 | 4 |
| E | 5 | 4 | 2 | 1 |
| F | 6 | 4 | 2 | 2 |
| G | 7 | 4 | 2 | 3 |
| H | 8 | 4 | 2 | 4 |
| I | 9 | 4 | 3 | 1 |
| J | 10 | 4 | 3 | 2 |
| K | 11 | 4 | 3 | 3 |
| L | 12 | 4 | 3 | 4 |
| M | 13 | 4 | 4 | 1 |
| N | 14 | 4 | 4 | 2 |
| O | 15 | 4 | 4 | 3 |
| P | 16 | 4 | 4 | 4 |

FIG. 8

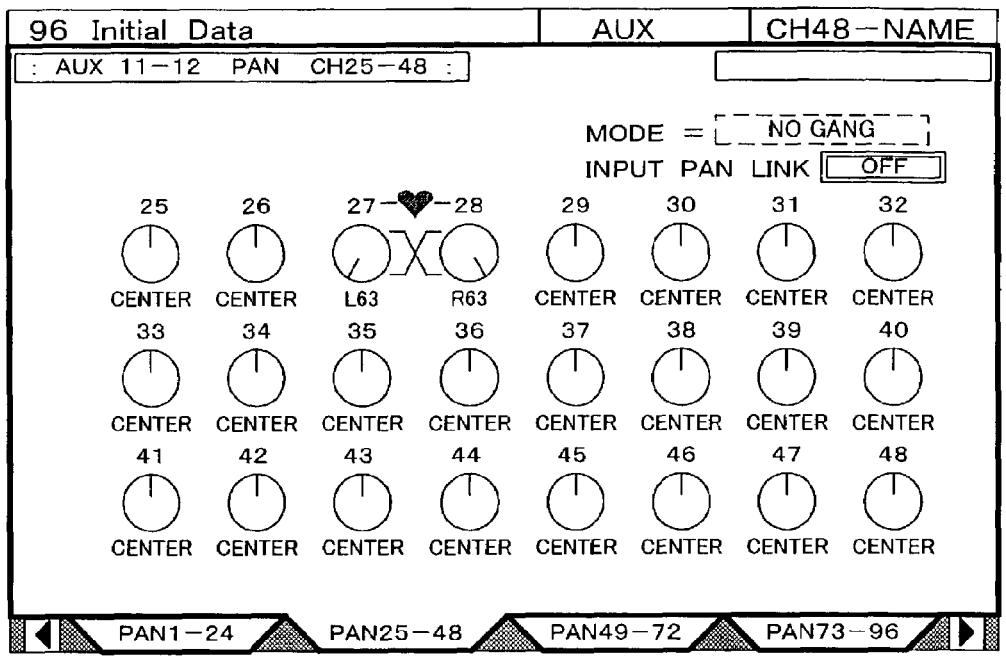
EXAMPLE 1 OF DISPLAY SCREEN
F I G. 9
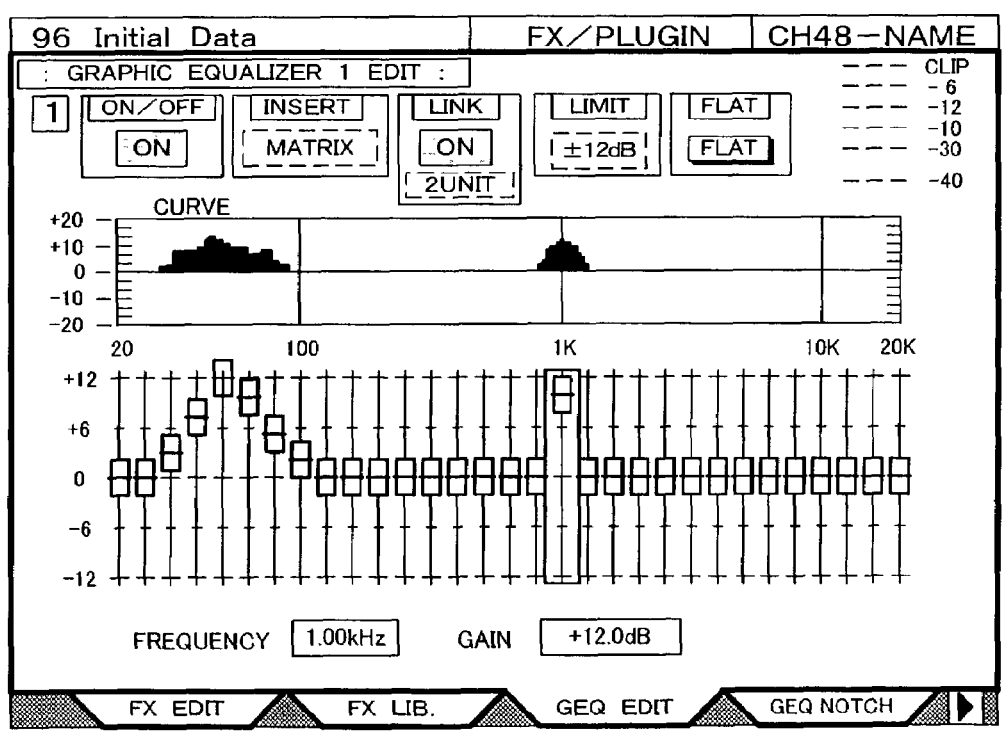
EXAMPLE 2 OF DISPLAY SCREEN
F I G. 1 0

SCREEN CHANGE CONTROL APPARATUS AND METHOD USING TABS

BACKGROUND OF THE INVENTION

The present invention relates to an improved screen change apparatus and method which permit a quick screen change or switchover in a tone reproduction apparatus such as a digital mixer, and more particularly to a technique for performing screen change control through operation or activation of a tab switch.

In many conventionally-known electronic sound signal processing apparatus, such as digital mixers, designed to reproduce musical tones, a tab (tab switch) is affixed to each of a great many screens (screen pages) showing respective current settings and operating states of a number of signal processing channels. When a user desires to ascertain the current settings and operating states of any desired one of the signal processing channels, he or she can operate or activate one of the tabs (tab switches) that corresponds to the desired processing channel, to thereby switch over to a display screen of the desired processing channel.

However, many of the conventional screen change techniques are only intended to switch between functions of the apparatus using the tabs (tab switches), in accordance with which the user has to perform a plurality of screen switching actions in order to switch over to a desired screen through the tab operation. Some of the conventional screen change techniques are arranged to permit a switchover to two screens of opposite natures through two screen switching actions, but, in this case, only a small number, equal to "the number of the tabs×2", of screens can be provided, so that the number of available screens is limited considerably.

SUMMARY OF THE INVENTION

In view of the foregoing, it is an object of the present invention to provide a screen change control apparatus and method which permit provision of a great may screens and also a quick switch between screens.

In order to accomplish the above-mentioned object, the present invention provides an improved screen change control apparatus for selecting a desired screen from among a plurality of displayable screens and displaying the selected desired screen on a display device, the plurality of displayable screens being classified in advance into a plurality of screen groups in such a manner that two or more of the screens belong to each one of the screen groups, which comprises: a first operator section operatable to designate a desired screen group; a processor adapted to perform first display control to cause said display device to display respective tabs of the two or more screens belonging to the desired screen group designated via said first operator section; and a second operator section operatable to designate a desired one of the tabs displayed on said display device, wherein said processor is further adapted to perform second display control to cause said display device to display the screen corresponding to the tab designated via said second operator section.

According to the primary aspect of the present invention, the plural number of screens (Y screens) are divided in advance into a plural number of screen groups (S screen groups) in preparation for a switch between the screens instructed by activation of the second operator section (e.g., a tab operator). Once one of the screen groups is selectively designated by activation of the first operator section (e.g., a shift operator), the two or more tabs belonging to the designated screen group are displayed on the display device by the first display control. Once a desired one of the displayed tabs is designated via the second operator section, the second display control control is perfromed to cause the display device to display the screen corresponding to the designated tab.

Namely, according to the present invention, a great number of screens (Y screens) are divided in advance into a plurality of screen groups (S screen groups). Thus, the present invention can selectively display any of screens corresponding to a great number of functions that is equivalent to a product between the number (T) of tabs within each screen group designatable by the second operator section and the number (S) of the screen groups. As a consequence, the present invention allows any apparatus, to which the present invention is applied, to have many functions corresponding in number to the product between the number (T) of tabs and the number (S) of the screen groups. Also, the present invention can greatly facilitate a search for any desired function by storing the groups of screens in association with particular functions. Further, by the provision of the first operator section dedicated to switching between the screen groups, the present invention can effect a quick shift or switchover to a desired screen group in a simplified manner; thus, the present invention allows the user to access a particular function at increased speed. As a result, the present invention not only permits storage of a multiplicity of function display screens, but also allows such stored display screens to be read out with a lesser number of operators (e.g., switches) to thereby greatly enhance the operability of an operation panel used.

According to another aspect of the present invention, the screen groups are arranged in predetermined order, and a determination is made as to whether there is any other designatable or displayable screen group before or after a currently designated screen group. Then, in accordance with the determination result, a shiftability indicating guide mark, such as a triangle mark, is displayed adjacent to the second operator section. With this arrangement, the present invention allows the user to readily identify the presence of any other designatable screen group adjoining (preceding or following) the currently designated screen group and thereby manipulate the operation panel with increased ease while imaging the order and arrangement of the screen groups.

The present invention is further characterized in that, even when a given screen group has been newly designated (i.e., there has been effected a switchover from one screen group to another) by activation of the first operator section, the one screen having been displayed up to the time of the designation of the give or other screen group is caused to remain displayed as before and the screen display is never renewed till next activation of the second operator section. With this arrangement, it is possible to preserve, as display history data, only a display screen necessary to the user and having been actually selected by activation of the second operator section. Further, there may be provided a display history tracing section, so that the user is allowed to quickly go back to a desired previous display screen by use of the history tracing section and thereby modify and confirm the current settings and operating states indicated by the previous display screen (backward operation step); the user can return to a current operation step quickly upon completion of the modification and confirmation of the previous display screen.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which:

FIG. 8 is a table for use in the embodiment, which defines exemplary correspondency among screen identification sign (tab identification sign), tab number (screen number), total number of tabs (screens) per screen group, tab set number (screen group number) and tab switch number;

FIG. 9 is a diagram showing a specific example of a screen that is actually displayed on a display of the digital mixer employing the screen-changing tab switch control of the present invention; and FIG. 10 is a diagram showing another specific example of a screen that is actually displayed on the display of the digital mixer employing the screen-changing tab switch control of the present invention.

DETAILED DESCRIPTION OF THE INVENTION

Figure 1:
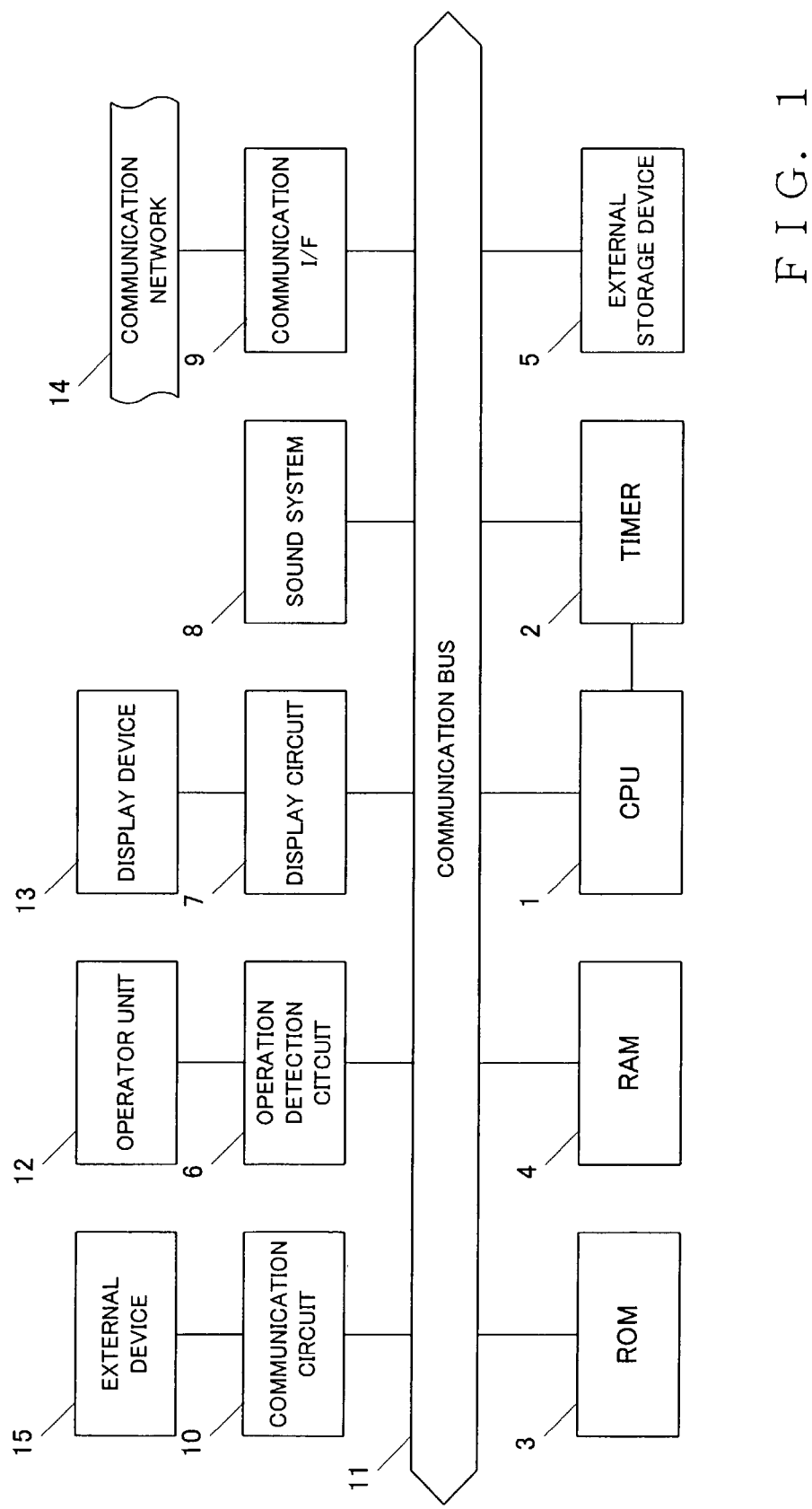
FIG. 1 is a block diagram showing a general hardware setup of a digital mixer equipped with a screen-changing tab switch control function according to an embodiment of the present invention.

FIG. 1 is a block diagram showing a general hardware setup of a digital mixer equipped with an automatic performance function, to which is applied a screen-changing tab switch control apparatus in accordance with an embodiment of the present invention. This digital mixer includes a central processing unit (CPU) 1, a timer 2, a read-only memory (ROM) 3, a random access memory (RAM) 4, an external storage device 5, an operator operation detection circuit 6, a display circuit 7, a sound system 8, a communication interface (I/F) 9, a communication circuit 10, etc. and these mentioned components 1 to 10 are connected with each other via a communication bus 11.

The CPU 1 controls behavior of the entire digital mixer, using clock pulses generated by the timer 2 and in accordance with predetermined software programs. The digital mixer carries out, in addition to normal digital mixing processing, screen-changing tab switch control processing that includes a shift switch depression process and tab switch depression process as will be later described in detail.

In the ROM 3, there are prestored predetermined control programs for controlling the digital mixer, which include various programs related to the normal digital mixing processing and screen-changing tab switch control processing, as well as various tables and data pertaining to these processing. In the RAM 4, there are stored various information such as flags and buffers to be used in the above-mentioned processing.

The external storage device 5 comprises any one or combination of a hard disk drive (HDD) and removable/portable storage media, such as a compact disk read-only memory (CD-ROM), flexible disk (FD), magneto-optical (MO) disk, digital versatile disk (DVD) and memory card, and the external storage device 5 is capable of storing various control programs and data. Namely, any of various control programs and data may be stored in the external storage device 5, rather than in the ROM 3, and read from the external storage device 5 into the RAM 4 as necessary; processed results may also be stored in the external storage device 5 as necessary.

Operator unit 12, which is connected to the operator operation detection circuit 6, is provided, for example, on an operation panel of the digital mixer, and includes a number of mixing operators such as switches, dials and sliders and screen manipulating switches SL, SR and F1-F4 to be used for screen-changing tab switch control. Display device 13 connected to the display circuit 7 includes a screen display section DP (FIG. 2) and various indicators provided on the operation panel.

The sound system 8 is designed to sound or audibly reproduce tones on the basis of tone signals generated on a channel (track or performance part)-by-channel basis, and it includes a DSP and at least one output amplifier circuit and speaker. If tone signals to be processed here are audio signals, tones are reproduced using a digital-to-analog (D/A) converter, while tone signals to be processed here are MIDI signals, tones are reproduced using a tone generator circuit or the like. To the communication interface 9 is connected a communication network 14, such as a local area network (LAN), Internet and/or telephone line, so that a desired control program, performance information and/or various data can be received via the communication network 14 from a server computer or the like and then stored in the external storage device 5.

The communication circuit 10 includes input/output terminals corresponding to predetermined channels, and it controls transmission/reception to/from an external device 15. The external device 15, connected to the channel-by-channel input/output terminals, is capable of transmitting and receiving tone signals, such as audio or MIDI signals, for reproducing tones. The external device 15 may be any one of audio equipment, electronic musical instrument, automatic performance apparatus, etc. This digital mixer has a function of performing mixing processing, under preset operating conditions, on tone signals of the channels input thereto from the external device 15 via the communication circuit 10, a function of causing the sound system 8 to reproduce the tone signals, and a function of outputting the tone signals to outside the mixer via the communication circuit 10 or communication interface 9.

[Exemplary Construction of Display Screen and Screen Manipulating Switches]

Figure 2:
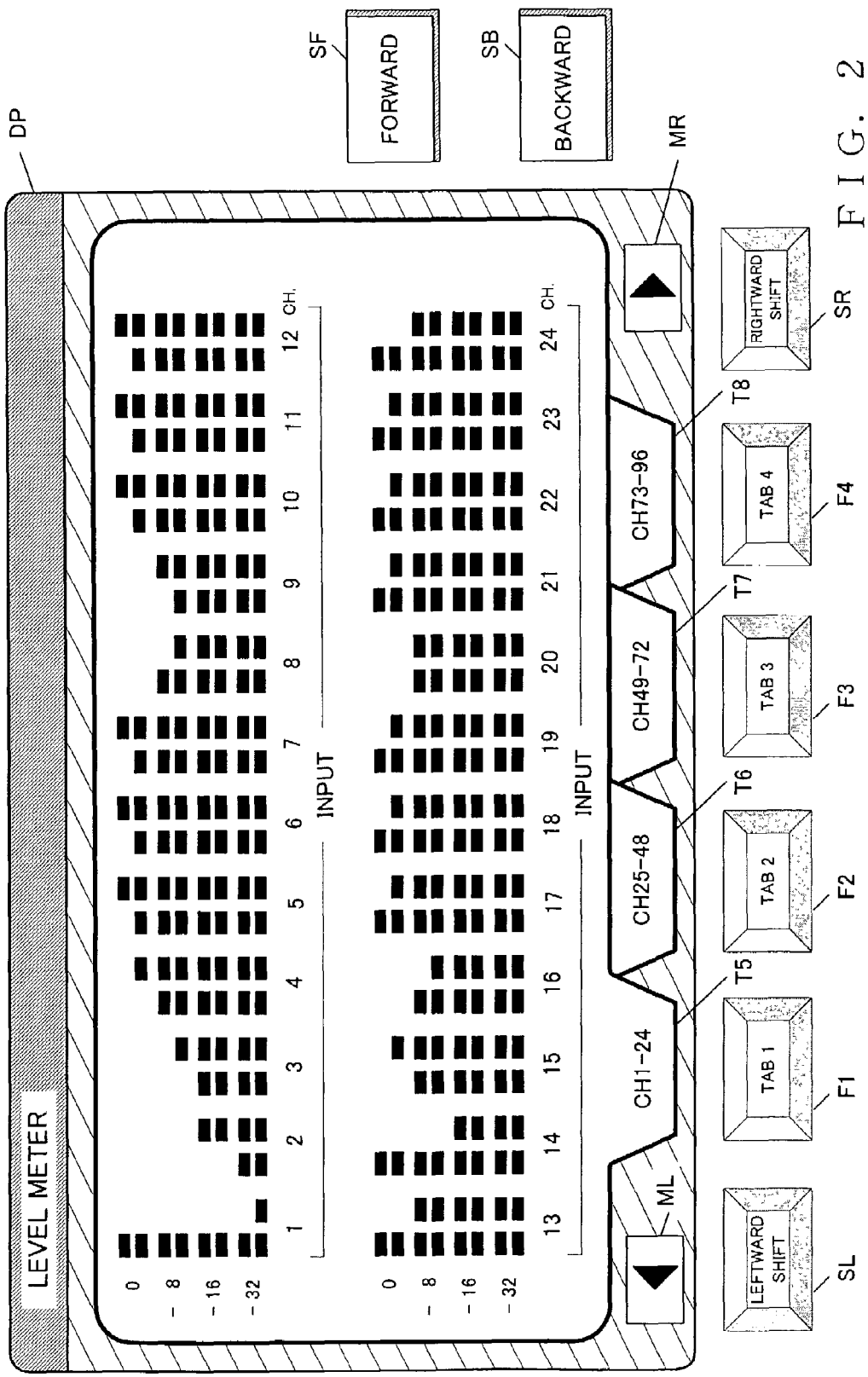
FIG. 2 is a diagram showing an exemplary arrangement or layout, on an operation panel, of a display screen and various screen manipulating switches.

When the mixing processing is to be performed on tone signals of many channels (e.g., 96 channels) in the digital mixer of FIG. 1, current settings and operating states of the individual channels are exhibited on the screen display section DP (FIG. 2) of the display device 13, so that a user can set desired operational conditions while visually ascertaining the current settings and operating states on the screen display section DP. At that time, the user is allowed to switch from one display screen over to another by means of a shift switch (shift key) and tab switch (function key) included in the operator unit 12 as the screen manipulating switches. FIG. 2 shows an exemplary arrangement or layout of the screen display section and various screen manipulating switches provided on the operation panel (not shown). From the viewpoints of viewability and operability, it is preferable that the screen display section and screen manipulating switches be provided substantially centrally on the relatively large operation panel.

On a main screen display area (main screen area) of the screen display section DP of FIG. 2, there can be displayed any one of a plurality of display screens belonging to a selected screen group. On a subsidiary display area of the screen display section DP, there can be displayed a plurality of tabs T5 to T8 corresponding to the displayable display screens of the selected screen group. Further, before and/or behind (to the left and/or right of) the horizontal row of the tabs T5 to T8 immediately below the main screen display area, there can be displayed a leftward shiftability indicating guide mark (in the illustrated example, left arrow button of a triangle shape) ML and/or rightward shiftability indicating guide mark (right arrow button of a triangle shape) MR depending on whether there is any selectable screen group preceding and/or following the currently selected screen group.

Furthermore, on the operation panel, there are provided first to fourth tab switches F1 to F4 and leftward and rightward shift switches SL and SR adjacent to and in corresponding relation to the displayed positions of the tabs T5 to T8 and left and right shift marks ML and MR.

Namely, because a plurality of screen groups are arranged in predetermined order in the instant embodiment, a determination is made here, on the basis of the arranged relationship among the screen groups, as to whether or not there is any other selectable screen group preceding or following the currently selected screen group. Then, on the basis of the determination result, either or both of the leftward and rightward shiftability marks ML, MR are displayed as shift guide marks indicating to the user that either or both of the shift switches SL and SR, i.e. leftward and rightward shifts, are currently enabled. Thus, the user can readily confirm the presence of any other screen group adjoining the currently selected screen group, so that he or she can easily manipulate the operation panel while imaging the order and arrangement of the screen groups.

Briefly speaking, according to the present invention, Y (given integral number) display screens (screen pages) are provided in advance in corresponding relation to display functions necessary for behavior and manipulation of the digital mixer, and these display screens are divided or classified in advance into a plurality of screen groups each including a total of T (integral number smaller than Y) screens. To allow the user to select from among the screen groups, either or both of the leftward and rightward shiftability indicating guide marks ML and MR can be displayed on the subsidiary display area of the screen display section DP, and the leftward and rightward shift switches SL and SR are provided in corresponding relation to the shiftability indicating guide marks ML and MR. By activating one of the shift switches SL and SR, the user can selectively designate any one of the screen groups, each including a total of T display screens, which his or her desired display screen belongs to.

Then, the tabs (T5 to T8) corresponding the T display screens belonging to the thus-designated screen group are visually displayed, as a tab set for the designated screen group, on the screen display section DP. Also, to allow the user to select the desired display screen from the designated screen group, T tab switches (F1 to F4) are provided in corresponding relation to the T tabs (T5 to T8) displayed on the screen display section DP. In this way, the desired display screen can be displayed by the user activating a corresponding one of the tab switches (F1 to F4).

In the illustrated example of FIG. 2, the number T is four (T=4); that is, the multiplicity of the previously provided display screens (i.e., Y display screens) are divided in advance into groups each having four (T=4) display screens. Once the rightward shift switch SR is operated or activated on a not-shown initial screen, the second screen group is designated, so that the tabs T5 to T8 corresponding to the four display screens of the thus-designated second screen group are displayed. Then, only when the tab switch F1 corresponding to the tab T5 is activated, the display screen corresponding to the tab T5, as illustrated in FIG. 2, is displayed on the main display area of the screen display section DP.

The display screen thus caused to show up on the screen display section DP by activation of any one of the tab switches F1-F4 is stored as screen display history data in a display history storage area within the RAM 4. With this arrangement, only the display screen necessary for the user and having been actually selected by any one of the tab switches F1-F4 and can be preserved as the screen display history data. Forward switch SF and backward switch SB are provided, as display history recall means, on suitable positions of the operation panel so that these forward and backward switches SF and SB can be used to trace the screen display history. Note that the displayed positions of these switches SF and SB need not necessarily be close to the screen display section DP.

For example, each time the back switch SB is activated or operated, the screen display history is traced back to the display screen selected by the preceding tab switch operation (tab operation), so as to show the preceding display screen. Thus, the user can quickly go back to a desired previous display screen and thereby modify and confirm the current settings and operating states indicated by the previous display screen (backward operation step), and then the user can return to the current operation step quickly upon completion of the modification and confirmation of the previous display screen. Then, each time the forward switch SF is activated or operated, the display of one or more screens selected by the tab operation is advanced, so that the user can return to a current operation step while ascertaining the history screen.

On the screen display section DP of FIG. 2, there is schematically displayed, just for reference purposes, a specific example of a display screen for 1st to 24th channels (CH1 to CH24) which is among four "level meter" display screens belonging to the second screen group related to input levels of a level meter.

Although the tabs T5 to T8 and shiftability indicating guide marks ML and MR are shown in FIG. 2 as positioned in a horizontal row adjacent to the lower end edge of the screen display section DP, these tabs and guide marks may be positioned in a horizontal row adjacent to the upper end edge of the screen display section DP. In another alternative, these tabs and guide marks may be positioned in a vertical row adjacent to the left or right side edge of the screen display section DP, in which case the tab switches F1 to F4 and shift switches SL and SR may be provided on portions of the operation panel adjacent to the displayed positions of the tabs and guide marks. Further, in place of the mechanical switches F1 to F4 and SL and SR provided on the operation panel, there may be provided touch sensors in the positions of the tabs T5 to T8 and shiftability indicating guide marks ML and MR displayed on the screen display section DP, so as to allow these tabs and marks to have touch switch functions in such a manner that the operation panel can function as a touch panel to allow the user to perform desired screen switching operation thereon.

[Selection of Display Screen]

Figure 3:
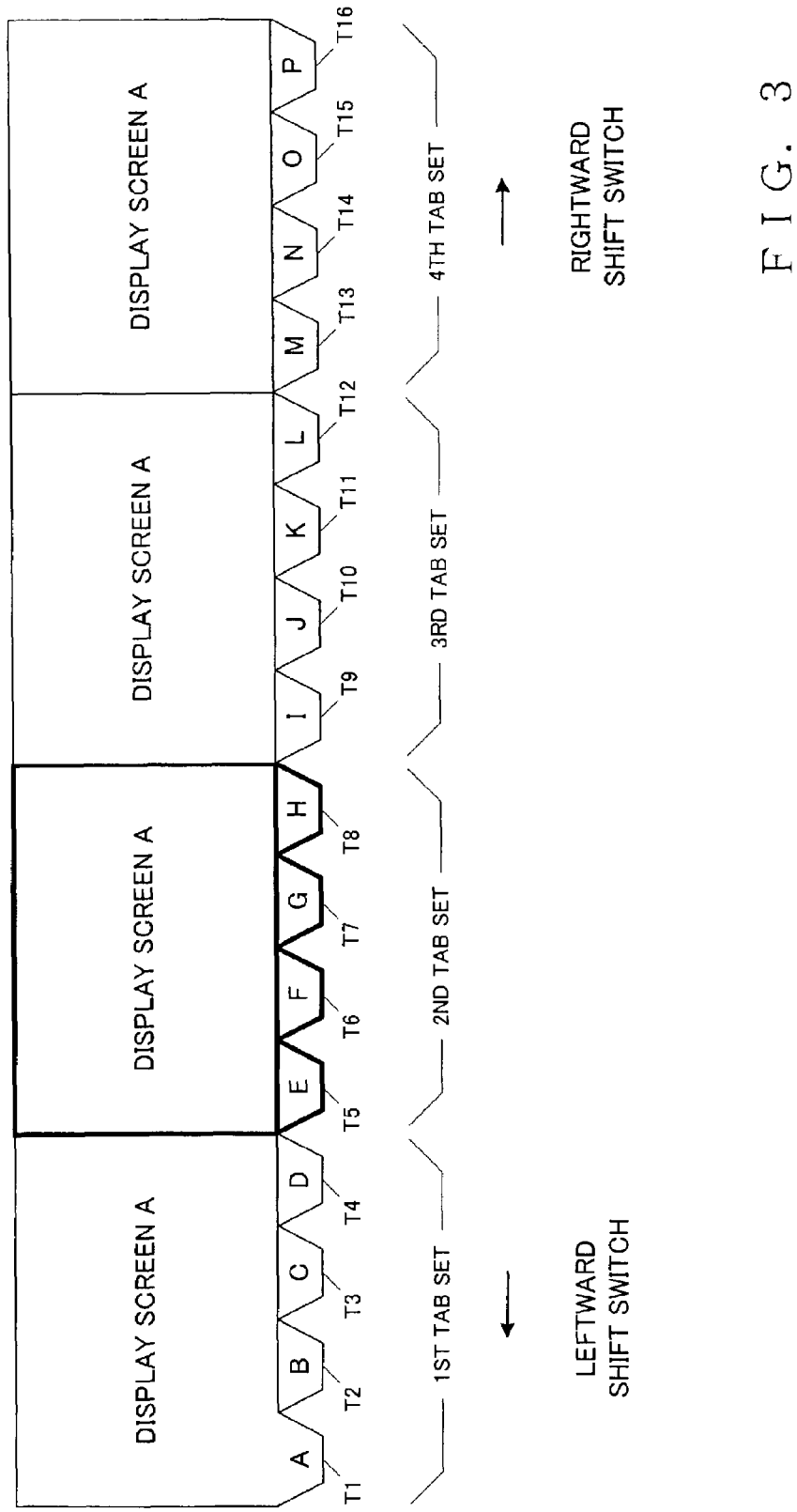
FIG. 3 is a diagram explanatory of a concept of a display screen selection scheme employed in the embodiment of the present invention.

According to the above-described screen-changing tab switch control of the present invention, a selection is made of any desired one of the tabbed screen groups, and a desired tab is designated from the selected tabbed screen group so that a switchover can be made to the desired display screen corresponding to the designated tab. Thus, even though the great many display functions are stored in memory, the screen-changing tab switch control of the present invention can readily call any desired one of the display functions with less screen switching actions, and it can thereby greatly enhance the operability of the operation panel. FIG. 3 is a diagram explanatory of the concept of the display screen selection scheme employed in the embodiment of the present invention.

Specifically, for convenience of explanation, FIG. 3 assumptively shows four display screens placed serially in a horizontal direction (left-and-right direction in the figure), assuming that the total number T of screens per screen group is "4" and the total number Y of the display screens stored and designatable in the digital mixer is "16" just as in the example of FIG. 2. Namely, in this case, the digital mixer has stored therein a total of 16 display screens (Y=16) to which are affixed tabs T1 to T16, respectively. Further, these tabs T1 to T16 and corresponding display screens are imparted with respective tab/screen numbers y ($1 \leq y \leq Y$); in this case, common number values "1" to "16" are imparted as both the tab numbers and the screen numbers. Hereinbelow, these tabs T1 to T16 and corresponding display screens will be described with common reference characters "A" to "P" (i.e., tab identification signs and screen identification signs) attached thereto for ease of understanding.

Briefly stated, every set of the designatable display screen and tabs affixed thereto is imparted with a common screen/tab number y ($1 \leq y \leq Y$). The Y designatable display screens and affixed tabs are divided in advance into S screen groups. Each of the screen groups includes T display screens and affixed tabs, and these tabs in each of the screen groups are collectively referred to as a "tab set". Further, every pair of the screen group and tab set is imparted with a common screen group/tab set number s ($1 \leq s \leq S$), and each of the tab switches (F1 to F4) is imparted with a tab switch number t ($1 \leq t \leq T$).

In the illustrated example of FIG. 3, all of the Y display screens and tabs A to P are imparted with respective screen numbers "1" to "16" and tab numbers "1" to "16", respectively, and each of the screen groups includes a fixed number of, four in this instance, display screens; that is, up to four display screens and four tabs are included in each of the screen groups. Further, in the illustrated example, the number of the tab sets equals the number of the screen groups S, which is "4" (i.e., Y/T=4). To the individual screen groups and tab sets, numbers "1" to "4" are imparted sequentially in the left-to-right direction as the screen group/tab set numbers s, and hence these screen groups are herein referred to as "first screen group" to "fourth screen group" and "first tab set" to "fourth tab set", respectively.

According to the screen-changing tab switch control of the present invention, as illustratively shown in FIG. 3, all of the display screens A to P are arranged dividedly in the first to fourth screen groups, and in each of the screen groups, four display screens are placed in stacked relation to each other. The first to fourth tab sets are added to the first to fourth screen groups, respectively. Further, in positions corresponding to the first to fourth tab sets displayed on the screen display section DP, there are provided the tab switches F1 to F4 imparted with tab switch numbers t ranging from "1" to "4". Furthermore, the leftward and rightward shift switches SL and SR are provided adjacent to opposite sides of the row of the tab switches.

First, activation of one of the shift switches SL and SR can select a desired one of the screen groups which is to be displayed on the screen display section DP. Then, once any one of the tab switches F1 to F4 is depressed, the display screen belonging to the selected screen group and corresponding to the tab indicated by the depressed tab switch is displayed on the screen display section DP.

Namely, if conceptually considered in connection with the example of FIG. 3, the four screen groups and affixed tab are placed side by side on the horizontally wide screen, and one of the screen groups is made displayable as indicated by a thick-line block in FIG. 3; the displayable screen group can be shifted or switched sequentially by sequential activation of the leftward or rightward shift switch SL or SR.

However, in the instant embodiment, depressing the leftward or rightward shift switch SL or SR alone can only switch the display of the tab set on the subsidiary display area (tab display area) without switching the display on the main screen display area; that is, when the leftward or rightward shift switch SL or SR is depressed alone, the display on the main screen display area is kept the same as before the activation of the shift switch SL or SR. For example, when only the rightward shift switch SR is depressed to switch to the second screen group while the display screen A of the first screen group is being displayed, the same display screen A is kept displayed on the main screen display area as denoted by the thick-line block of FIG. 3. Further depression of only the rightward shift switch SR in this state will still keep the same display screen displayed on the main screen display area. Namely, only when any one of the tab switches F1 to F4 is depressed after the depression of the rightward shift switch SR, the display screen on the main screen display area can be switched over another display screen belonging to the selected screen group. For example, when the rightward shift switch SR is depressed while the display screen A is being displayed in order to select the second screen group as denoted by thick line in FIG. 3 and then any one of the tab switches F1 to F4 is depressed, one of the screens E to H corresponding to the depressed tab can be displayed on the screen display section DP.

[Example of Screen Selection Operation]

Figure 4:
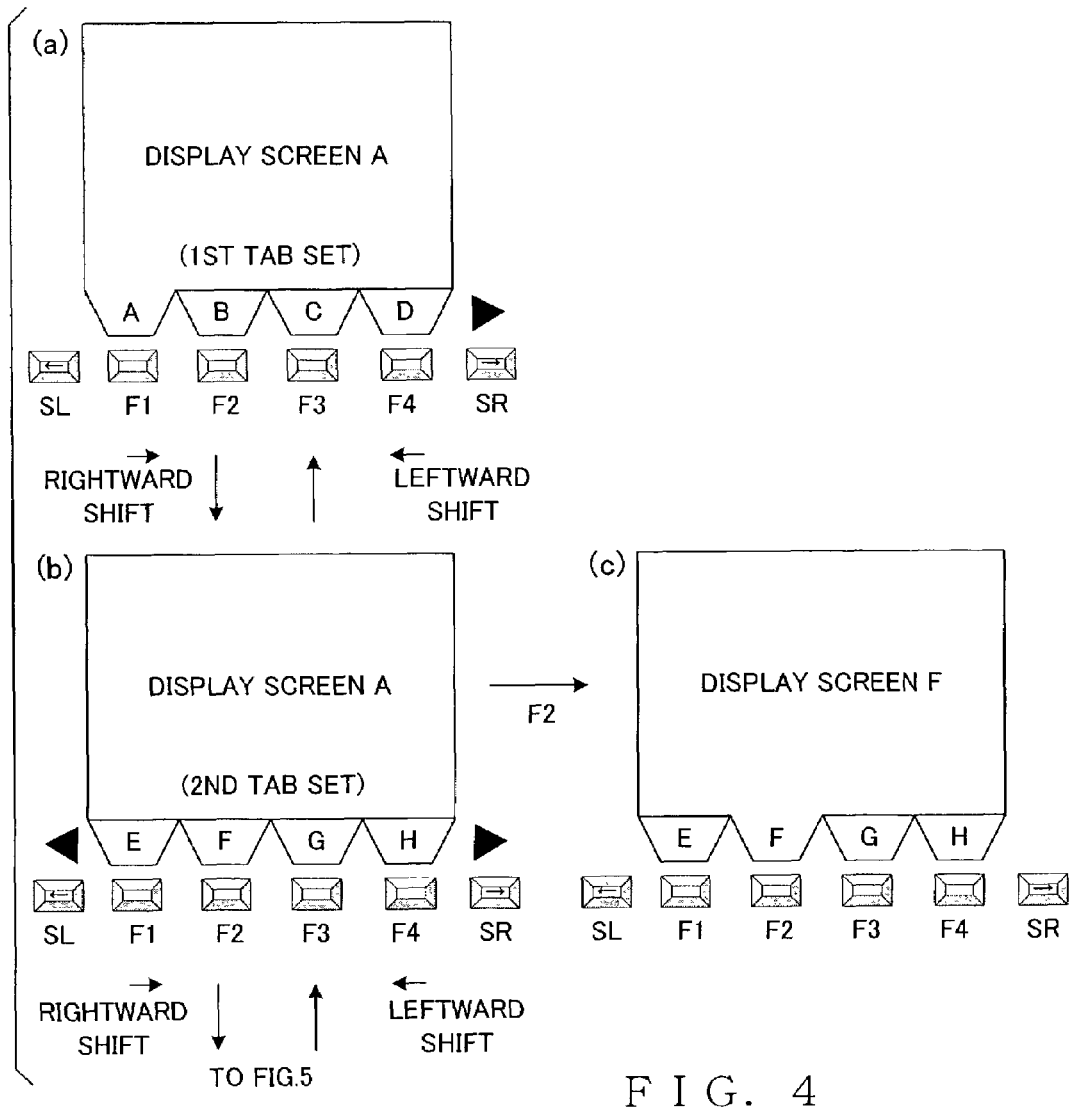
FIG. 4 is a diagram showing part of an example of screen operation based on the screen-changing tab switch control function of the present invention.
Figure 5:
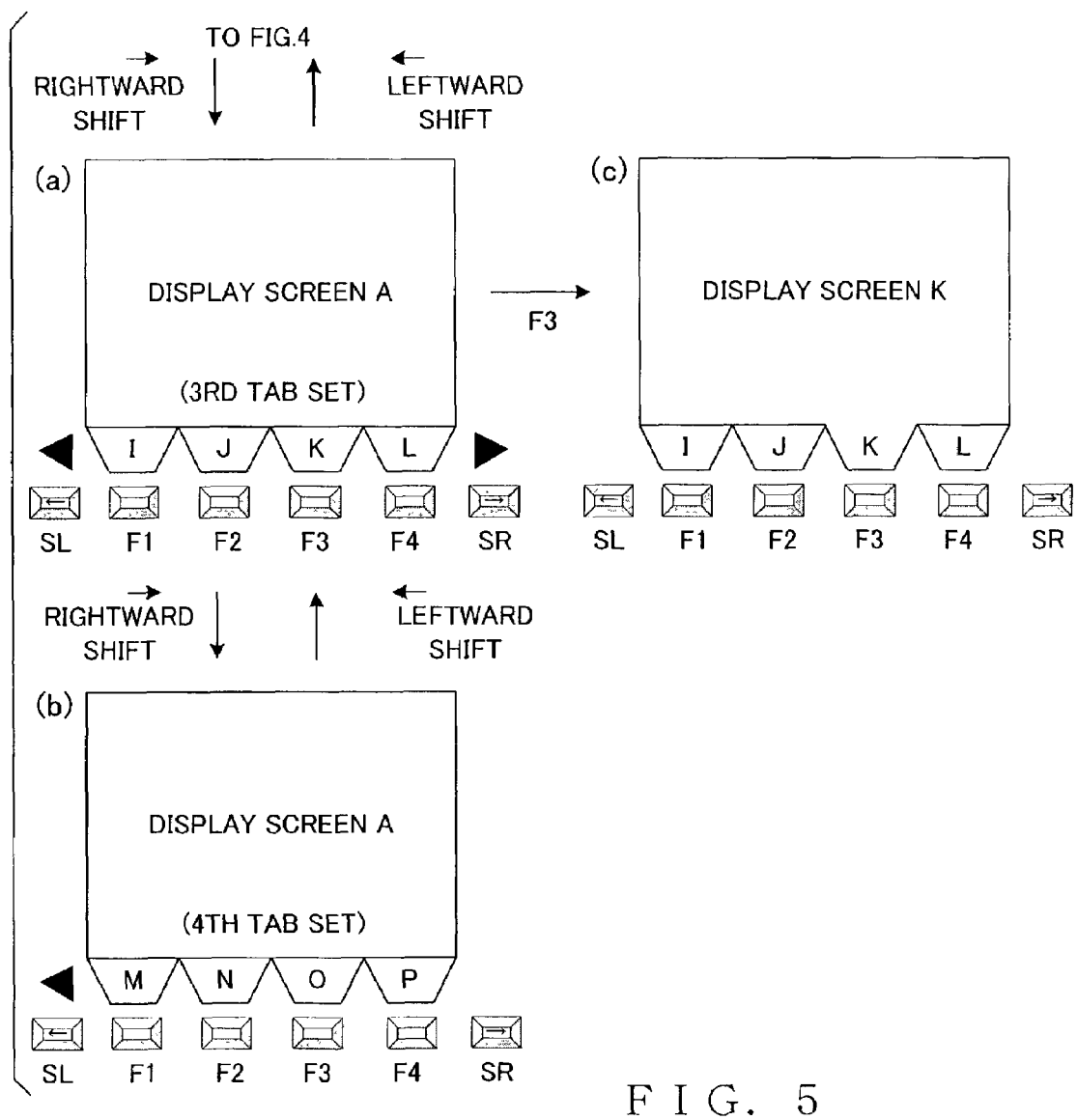
FIG. 5 is a diagram showing the remaining part of the example of screen operation based on the screen-changing tab switch control function of the present invention.

FIGS. 4 and 5 show an example of the screen selection operation based on the screen-changing tab switch control of the present invention. Here, the screen-changing tab switch control of the present invention will be outlined with reference to FIG. 4. In this tab switch control, all of the Y (=16) display screens A, B, C, . . . are divided into a plural number S (=4) of screen groups A-D, E-H, . . . , in preparation for cases where a switchover is to be effected, by the tab operation, from the display screen (y) selectively displayed from among the Y (=16) display screens A, B, C, . . . . Then, when, for example, the rightward shift switch SR is activated once while the first screen group A-D is being designated, as illustrated in an upper left portion (a) of FIG. 4, to selectively designate the second screen group E-H (s=2), the second tab set E-H corresponding to the newly designated second screen group is displayed as illustrated in a lower left portion (b) of FIG. 4. Then, once the tab "F" (t=2) is selected by activation of the tab switch "F2", the sixth display screen F (y=6) corresponding to the activated tab switch "F2" is displayed as illustrated in a lower right portion (c) of FIG. 4. In corresponding relation to the leftward and/or rightward shift switch SL, SR, there can be displayed the leftward shiftability indicating guide mark ML and/or rightward shiftability indicating guide mark MR indicating whether there is any other designatable screen group preceding and/or following the currently selected screen group.

More specifically, in an initial stage right after startup of the screen-changing tab switch control of the invention, the leading or first display screen A of the first screen group is displayed by default on the main screen display area of the screen display section DP while the first tab set including the tabs "A" to "D" (T1 to T4) is displayed on the subsidiary or tab display area, so that any one of the display screens A to D belonging to the first screen group can be displayed by activation of a corresponding one of the tab switches F1 to F4; note that the first display screen A can be selected via the tab switch F1 while any one of the other display screens B to D is being displayed. Further, the rightward shiftability indicating guide mark MR is displayed to the right of the tab display area, which informs that the rightward shift switch SR is currently in an operable or activatable state.

Then, once the rightward shift switch SR is activated, the display on the tab display area is switched from the first tab set including the tabs "A" to "D" to the second tab set including the tabs "E" to "H" (T5 to T8). However, because the main display area is constructed to retain the preceding display screen until a subsequent tab selection is made via any one of the tab switches F1 to F4, the same first display screen A is still kept displayed in this stage. Namely, in this stage, the screen display section DP displays the first display screen A and tabs as illustrated in the lower left portion (b) of FIG. 4.

The display illustrated in the lower left portion (b) of FIG. 4 corresponds to the display represented by the thick-line block in FIG. 3, where the leftward and rightward shiftability indicating guide marks ML and MR are both displayed so as to permit both of leftward and rightward screen switchovers via the leftward and rightward shift switches SL and SR. Therefore, depression of the leftward shift switch SL in this displayed -state can return the screen display section DP to the display illustrated in the upper left portion (a) of FIG. 4. Further, activation of any one of the tab switches F1 to F4 in the displayed state illustrated in the portion (b) of FIG. 4 can cause the corresponding one of the display screens E to H of the second screen group to be displayed on the screen display section DP. For example, if the tab switch "F2" is depressed, the sixth display screen F is displayed on the screen display section DP as illustrated in the portion (c) of FIG. 4.

Further, if the rightward shift switch SR is activated in the displayed state illustrated in the portion (b) of FIG. 4, then the third tab set including the tabs "I" to "L" (T9 to T12) is displayed on the screen display section DP with the first display screen A still remaining displayed on the screen display section DP, as illustrated in an upper left portion (a) of FIG. 5. In the displayed state illustrated in the portion (a) of FIG. 5, both of leftward and rightward screen switchovers are permitted by activation of the leftward and rightward shift switches SL and SR, and activation of any one of the tab switches F1 to F4 can cause the corresponding one of the display screens I to L of the third screen group to be selectively displayed on the screen display section DP, as in the displayed state illustrated in the portion (b) of FIG. 4. For example, depression of the leftward shift switch SL in the displayed state illustrated in the portion (a) of FIG. 5 can return the screen display section DP to the display illustrated in the portion (b) of FIG. 4. If the tab switch "F3" is depressed, the eleventh display screen K is displayed on the screen display section DP as illustrated in the portion (c) of FIG. 5.

Then, if the rightward shift switch SR is further activated in the displayed state illustrated in the portion (a) of FIG. 5, then the fourth or last tab set including the tabs "M" to "P" (T13 to T16) is displayed on the screen display section DP with the first display screen A still remaining displayed on the screen display section DP, as illustrated in a lower left portion (b) of FIG. 5. In the displayed state illustrated in the portion (b) of FIG. 5, activation of any one of the tab switches F1 to F4 can cause the corresponding one of the display screens M to P of the fourth screen group to be selectively displayed on the screen display section DP. In this case, because the last or fourth screen group has been designated, only the leftward shiftability indicating guide mark ML is displayed to the left of the tab display area, which informs that only the leftward shift switch SL is currently in an operable or activatable state. Thus, depression of the leftward shift switch SL in the displayed state illustrated in the portion (b) of FIG. 5 can return the screen display section DP to the display illustrated in the portion (a) of FIG. 5.

Namely, according to the above-described screen-changing tab switch control of the present invention, depression of one of the leftward and rightward shift switches SL and SR can newly designate a give screen group (e.g., second screen group E-H) while keeping the last-designated display screen (e.g., first display screen A) displayed on the main screen display area, so that the tab set (e.g., second tab set) representing general contents of the newly-designated screen group is displayed on the screen display section DP. Further, if any one of the tab switches F1 to F4 is depressed in this state, the display screen (e.g., sixth display screen) corresponding to the depressed tab switch (e.g., tab switch F2) is displayed on the main screen display area.

Further, the leftward shiftability indicating guide mark ML and/or rightward shiftability indicating guide mark MR is displayed adjacent to the left and/or right ends of the tab set, to thereby indicate to the user whether or not the leftward shift switch SL and/or rightward shift switch SR is currently in the activatable state. For example, in the state illustrated in the upper left portion (a) of FIG. 4, where there is no display screen provided before (in FIG. 3, to the left of) the first display screen A of the first screen group, only the rightward shiftability indicating guide mark MR is displayed, without the leftward shiftability indicating guide mark ML being displayed, to indicate to the user that there are one or more display screens after (to the right of) the fourth display screen D and a switchover to the second screen group can be effected. Further, in the display state illustrated in the lower left portion (b) of FIG. 5, where there is no display screen provided after (to the right of) the 16th display screen P of the last screen group, only the leftward shiftability indicating guide mark ML is displayed, without the rightward shiftability indicating guide mark MR being displayed, to indicate to the user that there are display screens before (to the left of) the 13th display screen M and a switchover to the third screen group can be effected.

In this way, the user is allowed to simply and easily access and read a desired display screen to the screen display section DP while imaging the arrangement, order and organization of the display screens A to P as illustratively shown in FIG. 3.

[Shift Switch Depression Process]

Figure 6:
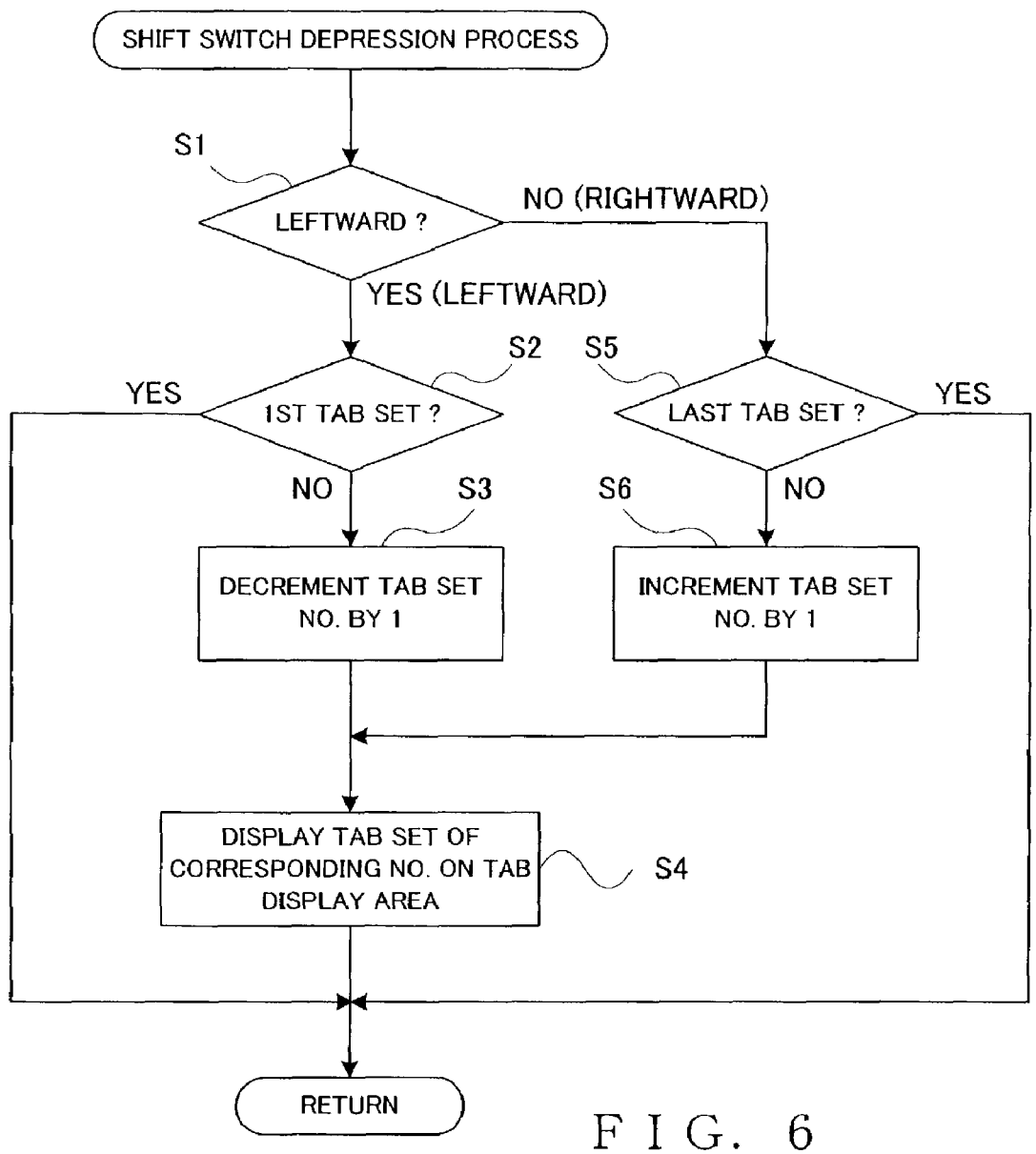
FIG. 6 is a flow chart showing an exemplary step sequence of a shift switch depression process carried out in the embodiment of the present invention.

Processing performed on screen data on the basis of activation of the shift switch SL or SR in the instant embodiment is herein referred to as a "shift switch depression process". FIG. 6 is a flow chart showing an exemplary step sequence of the shift switch depression process carried out in the instant embodiment. This shift switch depression process is a routine included in not-shown main processing, which is started up in response to depression of the leftward or rightward shift switch SL or SR. The shift switch depression process and next tab switch depression process will be described in relation to an assumptive case where the first to fourth screen groups are arranged side by side horizontally (in the left-to-right direction) and the total number T of tabs (screens) included in each of the screen groups is fixed at four (T=4) as in the examples of FIGS. 3 to 5.

Once one of the shift switches SL and SR is activated, a determination is made at first step S1 as to whether or not the activated switch is the leftward shift switch SL. If so, the process goes to step S2, where a further determination is made as to whether the first tab set (T1(A)-T4(D)) is currently displayed on the screen display section DP, i.e. whether the first screen group placed leftmost is currently designated. If the first tab set is currently displayed (i.e., the first screen group is currently designated) as determined at step S2, the shift switch depression process is immediately terminated, and control returns to the not-shown main processing.

If, on the other hand, the first tab set is not currently displayed as determined at step S2, the process goes to step S3 in order to decrement the tab set number s by "1" (i.e., s←"−1"); for example, at step S3, this decrementing operation can switch the second tab set back to the first tab set. Then, an operation is performed at step S4 for displaying the tab set of the thus-decremented number on the tab display area of the screen display section DP. After that, the shift switch depression process is brought to an end, and control returns to the main processing.

If, on the other hand, the activated switch is the rightward shift switch SR, the process goes to step S5, where a further determination is made as to whether the last or Sth tab set (in the illustrated examples of FIGS. 3 to 5, the fourth tab set T13(M)-T14(P)) is currently displayed on the screen display section DP, i.e. whether the Sth screen group placed rightmost is currently designated. If the last tab set is currently displayed (i.e., the last screen group is currently designated) as determined at step S5, the shift switch depression process is immediately terminated, and control returns to the not-shown main processing.

If, on the other hand, the last tab set is not currently displayed as determined at step S5, the process goes to step S6 in order to increment the tab set number s by "1" (i.e., s←"−1"); for example, at step S6, this incrementing operation can switch the second tab set to the third tab set. Then, an operation is performed at next step S4 for displaying the tab set of the thus-incremented number on the tab display area of the screen display section DP. After that, the shift switch depression process is brought to an end, and control returns to the main processing.

[Tab Switch Depression Process]

Figure 7:
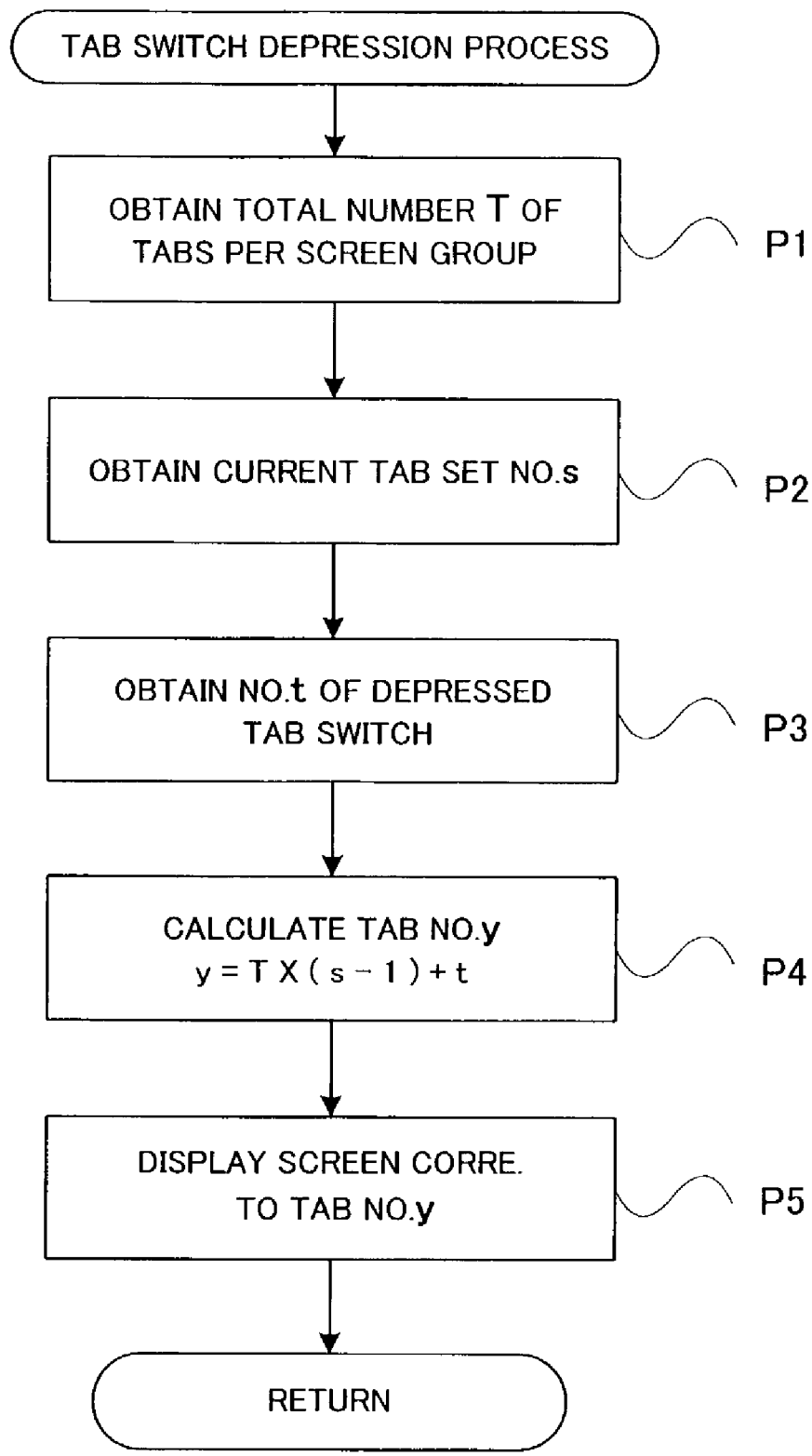
FIG. 7 is a flow chart showing an exemplary step sequence of a tab switch depression process carried out in the embodiment.

Processing performed on screen data on the basis of activation of any one of the tab switches (function switches) F1 to F4 in the instant embodiment is herein referred to as a "tab switch depression process". FIG. 7 is a flow chart showing an exemplary step sequence of the tab switch depression process carried out in the instant embodiment. This tab switch depression process is a routine included in the not-shown main processing, which is started up in response to depression of any one of the tab switches F1 to F4.

Once any one of the tab switches F1 to F4 is activated, the total number T of tabs in each of the screen groups (T=4 in the examples of FIGS. 3 to 5) is obtained at step P1, and then the current tab set number s (e.g., s=2 when the second tab set is being displayed) is obtained at step P2.

Further, at step P3, the number t (e.g., t=2 when the tab switch F2 has been activated) of the activated tab switch F1-F4 is obtained. Then, the tab number y is obtained at next step P4 on the basis of Equation (1) below.

$$y = T \times (s-1) + t \qquad \text{Equation (1)}$$

After that, an operation is carried out at step P5 for displaying, on the screen display section DP, the yth display screen corresponding to the tab number y. Then, this tab switch depression process is brought to an end, and control returns to the not-shown main processing. If T=4, s=2 and t=2 as in the examples noted above, the tab number y is "6", so that the sixth display screen F is displayed as illustratively shown in the lower right portion (c) of FIG. 4.

Whereas step P4 in the tab switch depression process has been described above as using a mathematical expression to determine a display screen to be displayed on the screen display section DP, the display screen to be displayed may be determined by use of a table. FIG. 8 shows an example of such a table defining correspondency among screen identification sign (tab identification sign), tab number (screen number) y, total number T of tabs (screens) per screen group, tab set number (screen group number) s and tab switch number t which can be used in the screen-changing tab switch control of the present invention. The example of FIG. 8 is based on the premise that the total number Y of displayable screens is 16, the number S of tab sets (screen groups) is 4, and the number of tabs (screens) per screen group is fixed at 4 and equals the total number T of tabs per screen group as noted earlier.

FIGS. 9 and 10 show, for reference purposes, specific examples of screens that are actually displayed on the display device of the digital mixer employing the screen-changing tab switch control of the present invention. Specifically, FIG. 9 shows a panning setting screen for the 25th and 48th channels CH25 to CH48; using this panning setting screen, the panning settings can be made in any one of a "channel-by-channel independent panning" scheme where the panning adjustment is performed independently for each of left and right channels, "interlinked panning" scheme where the panning adjustment is performed for the left and right channels in a same direction in an interlinked or interrelated manner, and "opposite-direction interlinked panning" scheme where the panning adjustment is performed for the left and right channels in opposite directions in an interlinked manner. In the illustrated example of FIG. 9, the tone volumes of the 27th and 28th channels CH27 and CH28 are set by the opposite-direction interlinked panning scheme. Further, FIG. 10 is an editing screen representative of a graphic equalizer; using this editing screen, it is possible to set an on/off state of the graphic equalizer, set a position to be inserted in, set a link function, set a limit value and select a flat characteristics, as well as boost/cut amounts of individual frequency bands.

[Various Modifications]

Whereas the particular embodiment of the present invention has been described so far, the present invention may be modified variously as set forth, by way of example, in items (1) to (4) below.

(1) Whereas the tab switches and shift switches have been described above as being hardware switches, they may be in the form of a touch panel or other software switches. For example, these tab switches and shift switches may be in the form of tab keys and shift keys whose icons are visually displayed so as to be clicked by a point-and-click device such as a mouse.

(2) Although the total number of displayable tabs (display screens) has been described above as "16", it may be greater or smaller than "16". Alternatively, the total number of displayable screens need not necessarily be an integer multiple of the number T of tabs or display screens per screen group.

(3) Further, whereas the shift switches have been described above as being leftward and rightward shift switches, they may be upward and downward shift switches ("↑" and "↓"), or oblique shift switches. In another alternative, the shift switches may be any desired combination of such upward, downward and oblique shift switches.

(4) Furthermore, although the embodiment has been described as displaying the leading display screen (screen A) of the first screen group as the initial display screen to be displayed by default upon startup of the screen-changing tab switch control of the invention, any other initial display screen may be set as desired by the user. Alternatively, a given screen displayed at the time when the screen-changing tab switch control is terminated may be automatically set as such an initial display screen.

In summary, the present invention is characterized by dividing a number of displayable screens (Y screens) into a plurality of screen groups (S screen groups). Thus, with the present invention, any apparatus, to which the present invention is applied, is allowed to have great many functions corresponding in number to a product between the number (T) of the tab operators (tab switches) and the number (S) of the screen groups. Also, the present invention can greatly facilitate a search for any desired function by storing the screen groups in association with particular functions. Further, by the provision of the shift operators (shift switches) dedicated to switching between the screen groups, the present invention can effect a quick switchover to a desired screen group in a simple manner; thus, the present invention can expedite an operation for accessing a particular function via the tab operator. As a result, the present invention permits storage of a multiplicity of function display screens, allows such display screens to be read out with a lesser number of operators, and thereby greatly enhance the operability of the operation panel used.

The present invention is further characterized by making a determination is made, from relationship between the screen groups arranged in predetermined order, as to whether there is any other designatable or displayable screen group before or after a currently designated screen group, and then displaying a shiftability indicating guide mark, such as a triangle mark, in accordance with the determination result. With this arrangement, the present invention allows the user to readily confirm the presence of any other screen group adjoining the currently designated screen group and thereby manipulate the operation panel with increased ease while imaging the order and arrangement of the screen groups.

The present invention is further characterized in that, even when a given screen group has been newly designated by activation of the shift operator, a screen having been displayed up to the time of designation of the given screen group is caused to remain displayed just as before and the screen display is never renewed till next activation of the tab operator. With this arrangement, it is possible to preserve, as display history data, only a display screen necessary to the user and having been selected by activation of a corresponding tab. Thus, the user is allowed to quickly go back to a desired previous display screen by use of the history tracing operator and thereby modify and confirm the current settings and operating states indicated by the previous display screen (backward operation step), and the user can return to a current operation step quickly upon completion of the modification and confirmation of the previous display screen.

The present invention relates to the subject matter of Japanese Patent Application No. 2001-136429 filed May 7, 2001, the disclosure of which is expressly incorporated herein by reference in its entirety.

What is claimed is:

1. A screen change control apparatus for selecting a desired screen from among a plurality of displayable screens and displaying the selected desired screen on a display device, the plurality of displayable screens being classified in advance into a plurality of screen groups in such a manner that two or more of the screens belong to each of the screen groups, each of the screens belonging to one of the screen groups, said screen change control apparatus comprising:

a first operator section operable to designate a desired screen group;

a processor adapted to perform first display control to cause said display device to display only respective tabs of the two or more screens belonging to the desired screen group designated via said first operator section; and a second operator section operable to designate a desired one of the tabs displayed on said display device, said second operator section comprising physical switches corresponding to the tabs, each of the physical switches being disposed near said display device in positionally corresponding relation to a tab, memory that stores, as display history information, information of the screen corresponding to the designated tab displayed on said display device, wherein said processor is further adapted to perform second display control to cause said display device to display the screen corresponding to the tab designated by operation of any one of the physical switches in said second operator section, and wherein when the tabs of the two or more screens belonging to the screen group designated via said first operator section are to be displayed on said display device, said processor performs said first display control to switch only the display of the tabs in accordance with designation by said first operator section while still keeping a last-designated screen displayed on said display device, and wherein the screens belonging to each of the screen groups is equal to or smaller in number than the physical switches, and wherein, when said first display control is to be performed in response to operation of said first operator section, the physical switches, positionally corresponding to the displayed tabs, are assigned to the displayed tabs, and wherein said processor further adapted to perform history recall control for reading out the display history information from said memory to cause said display device to display the display history information.

2. A screen change control apparatus as claimed in claim 1 wherein the plurality of screen groups are arranged in a predetermined order, and said first operator section can sequentially designate, in response to sequential activation thereof, the screen groups in accordance with the predetermined order.

3. A screen change control apparatus as claimed in claim 2 wherein said first operator section includes a rightward shifting operator for sequentially designating the screen groups in a forward direction in accordance with the predetermined order, and a leftward shifting operator for sequentially designating the screen groups in a reverse direction in accordance with the predetermined order.

4. A screen change control apparatus as claimed in claim 2 which further comprises an indicator section that displays a guide mark indicating whether or not there is any screen group that can be designated next.

5. A screen change control apparatus as claimed in claim 1 wherein the last-designated screen kept displayed on said display device is a screen corresponding to a tab designated last via said second operator section, and wherein when another tab is subsequently designated via said second operator section, the last-designated screen kept displayed on said display device is switched to the screen corresponding to the another tab through said second display control.

6. A screen change control apparatus as claimed in claim 1, wherein said screen change control apparatus is used for a tone reproduction apparatus, a plurality of channels in the tone reproduction apparatus being divided into groups in association with the screen groups, the plurality of channels being further divided into subgroups in association with the screens of individual ones of the screen groups, the screen displayed in correspondence with the designated tab being a display screen related to two or more channels belonging to the subgroup.

7. A screen change control method for selecting a desired screen from among a plurality of displayable screens and displaying the selected desired screen on a display device, the plurality of displayable screens being classified in advance into a plurality of screen groups in such a manner that two or more of the screens belong to each of the screen groups, each of the screens belonging to one of the screen groups, said screen change control method comprising:

a step of designating a desired screen group;

a step of causing said display device to display only respective tabs of the two or more screens belonging to the desired screen group designated via said step of designating;

a step of using any one of physical switches, corresponding to the tabs, to designate a desired tab from among the tabs displayed on said display device, each of the physical switches being disposed near said display device in positionally corresponding relation to a tab; and a step of causing said display device to display the screen corresponding to the desired tab designated, from among the tabs displayed on said display device, by operation of any one of the physical switches, and a step of storing, as display history information, information of the screen corresponding to the designated tab displayed on said display device, and a step of performing history recall control for reading out the display history information from a memory to cause said display device to display the display history information, wherein when the tabs of the two or more screens belonging to the screen group designated via said step of designating are to be displayed on said display device, said step of causing said display device to switch only the display of the tabs in accordance with designation by said step of designating while still keeping a last-designated screen displayed on said display device, and wherein the screens belonging to each of the screen groups is equal to or smaller in number than the physical switches, and wherein when the display of the tabs is executed in accordance with designation by said step of designating, the physical switches, positionally corresponding to the displayed tabs, are assigned to the displayed tabs.

8. A computer program comprising computer program code means for performing all the steps of claim 7 when said program is run on a computer.

9. A machine-readable storage medium containing a group of instructions to cause a computer to implement a screen change control method defined in claim 7.

* * * * *